US006943961B2

(12) United States Patent
Eguchi

(10) Patent No.: US 6,943,961 B2
(45) Date of Patent: Sep. 13, 2005

(54) ZOOM LENS SYSTEM AND FOCUS ADJUSTMENT METHOD THEREOF

(75) Inventor: Masaru Eguchi, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/809,441

(22) Filed: Mar. 26, 2004

(65) Prior Publication Data

US 2004/0190157 A1 Sep. 30, 2004

(30) Foreign Application Priority Data

Mar. 28, 2003 (JP) ........................................ 2003-090112

(51) Int. Cl.⁷ .......................... G02B 15/14; G03B 17/00
(52) U.S. Cl. .......................... 359/687; 359/683; 396/79
(58) Field of Search ................................ 359/676, 683, 359/687; 396/79

(56) References Cited

U.S. PATENT DOCUMENTS

| 4,978,204 A | * 12/1990 | Ito .............................. 359/689 |
| 6,397,009 B1 | 5/2002 | Ito et al. ....................... 396/79 |
| 2003/0197950 A1 | 10/2003 | Eguchi ....................... 359/687 |
| 2004/0032670 A1 | 2/2004 | Eguchi ....................... 359/687 |

FOREIGN PATENT DOCUMENTS

| JP | 5-323177 | 12/1993 |
| JP | 2000-352649 | 12/2000 |

* cited by examiner

*Primary Examiner*—Georgia Epps
*Assistant Examiner*—William Choi
(74) *Attorney, Agent, or Firm*—Greenblum & Bernstein, P.L.C.

(57) ABSTRACT

A zoom lens system includes at least three lens groups. Zooming is performed by moving at least two lens groups. The first lens group and the second lens group are formed as the focus-adjusting lens groups which are movable in the optical-axis direction for performing the narrower zoom adjustment when the zoom lens system is being assembled. The focus-adjusting lens groups satisfy the following condition:

$$0.4 < \{K1(L) - K1(S)\}/\{K2(L) - K2(S)\} < 1.6 \qquad (1)$$

wherein

K1(L) designates the focus sensitivity of the first lens group at the long focal length extremity;

K1(S) designates the focus sensitivity of the first lens group at the short focal length extremity;

K2(L) designates the focus sensitivity of the second lens group at the long focal length extremity; and K2(S) designates the focus sensitivity of the second lens group at the short focal length extremity.

9 Claims, 1 Drawing Sheet

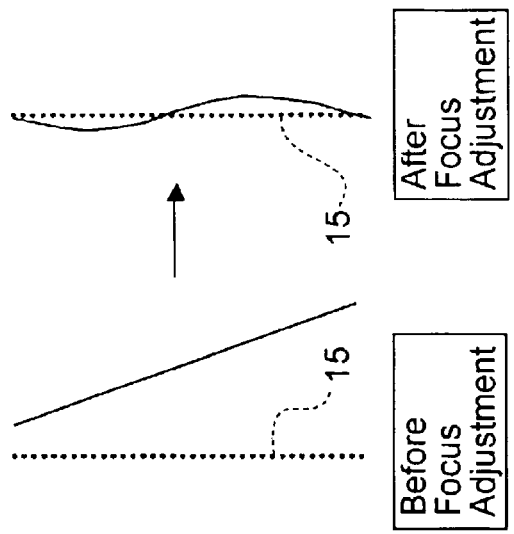
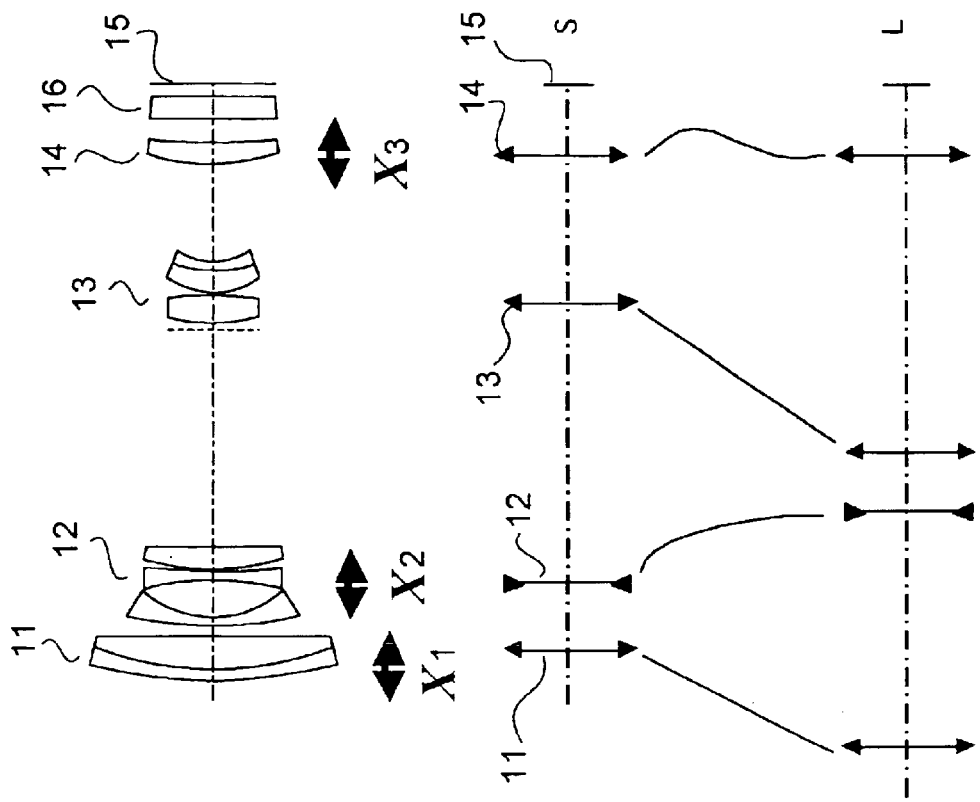

ZOOM LENS SYSTEM AND FOCUS ADJUSTMENT METHOD THEREOF

BACKGROUND OF THE INVENTION

1. Field of the Invention

The present invention relates to a zoom lens system having at least three lens groups, and also relates to a focus adjustment method for such a zoom lens system.

2. Description of the Prior Art

In a zoom lens system, a zoom adjustment by which (i) a position of an image plane does not move upon zooming, and (ii) the image plane coincides (within an allowable tolerance) with the film surface (the image-forming plane) is essential.

More specifically, the above (i) is referred to as a zoom adjustment in the narrower sense (hereinafter, an narrower zoom adjustment); and the above (ii) is referred to as a back-focus adjustment.

The term "focus adjustment" (a part of the title of the present invention) is generally understood as a zoom adjustment in the broader sense (hereinafter, a broader zoom adjustment) which includes the concepts of the narrower zoom adjustment and the back-focus adjustment.

In the prior art, the broader zoom adjustment (i.e., the focus adjustment) has been performed by mechanically adjusting the positions of the lens groups (focus-adjusting lens groups), when the zoom lens system is being assembled.

Furthermore, in the focus adjustment (the broader zoom adjustment) of the prior art, the movement of the focal point at both the short and long focal length extremities is mechanically corrected by using two focus-adjusting lens groups at two respective positions. However, the movement of the focal point at an intermediate focal length cannot be adequately corrected. Particularly, in a zoom lens system which requires a high resolution, the movement of the focal point at an intermediate focal length has become a problem to be solved.

On the other hand, in recent years, in optical systems which are used in digital cameras, etc., a rear-focusing type lens system in which the focusing lens group is light in weight, or an internal-focusing type lens system, has often been employed. In these types of focusing, the position of the focusing lens group is pulse-controlled. According to a pulse-control process, even a variable-focus lens system, in which the position of the focal point changes with a change in focal length, can be utilized in the same way as a zoom lens system is used, by memorizing an in-focus object distance per focal length.

However, if a focusing function and a correcting-function for the focal-point movement are provided in the focusing lens group of a variable-focus lens system, the traveling distance of the focusing lens group becomes longer, so that the overall length of the lens system becomes longer. Furthermore, if the broader zoom adjustment (the focus adjustment) is carried out by one focus-adjusting lens group, the distance between the focus-adjusting lens group and a lens group immediately in front of the focus-adjusting lens group needs to be made longer; likewise, the distance between the focus-adjusting lens group and a lens group immediately behind the focus-adjusting lens group needs to be made longer. These distances are necessary for securing a space for the broader zoom adjustment (the focus adjustment). Consequently, it becomes difficult to attain further miniaturization of the lens system. In particular, if the distance between the first lens group and the second lens group becomes longer, the diameter of the first lens group becomes undesirably larger.

The applicant of the present invention has proposed a focus-adjusting method, in Japanese Unexamined Patent Publication No. 2000-352649, which reduces a focus shift at an intermediate focal length. According to the focus-adjusting method of the above-mentioned publication, it becomes possible to mechanically adjust the positions of at least three lens groups, and to calculate the amount of correction based on the amount of movement of the focal point at three focal lengths at least.

The focus-adjusting method mentioned above can make a focus shift after the broader zoom adjustment (the focus adjustment) smaller; however, no consideration has been taken to the traveling distance and direction of the focus-adjusting lens groups. Therefore the distance between the focus-adjusting lens groups has to be made longer in order to prevent the focus-adjusting lens groups from interfering with each other. As a result, the overall length of the lens system tends to be longer.

SUMMARY OF THE INVENTION

The present invention provides a zoom lens system having at least three lens groups and a focus adjustment method thereof. More specifically, according to the present invention, the distance between the focus-adjusting lens groups can be made shorter by considering the positions of the focus-adjusting lens groups and the focus-adjusting direction thereof.

According to an aspect of the present invention, there is provided a zoom lens system which includes at least three lens groups, and in which zooming is performed by moving at least two lens groups. In such a zoom lens system, a first lens group and a second lens group, in this order from an object, are arranged to be the focus-adjusting lens groups which are movable in the optical-axis direction for performing the narrower zoom adjustment (i.e., for not moving a position of an image plane upon zooming) when the zoom lens system is being assembled. The focus-adjusting lens groups satisfy the following condition:

$$0.4 < \{K1(L) - K1(S)\} / \{K2(L) - K2(S)\} < 1.6 \tag{1}$$

wherein

K1(L) designates the focus sensitivity of the first lens group at the long focal length extremity;

K1(S) designates the focus sensitivity of the first lens group at the short focal length extremity;

K2(L) designates the focus sensitivity of the second lens group at the long focal length extremity; and K2(S) designates the focus sensitivity of the second lens group at the short focal length extremity.

In the zoom lens system according to the present invention, at least one of any lens groups behind the second lens group can be formed as a focus-adjusting lens group which is movable in the optical-axis direction for performing the back-focus adjustment (i.e., for coinciding the image plane with the image-forming plane) when the zoom lens system is being assembled; or, all the lens groups can be formed as the focus-adjusting lens groups which are movable in the optical-axis direction for performing the back-focus adjustment when the zoom lens system is being assembled.

According to another aspect of the present invention, there is provided a focus-adjustment method of a zoom lens system which includes at least three lens groups, and in which zooming is performed by moving at least two lens groups. The focus-adjustment method includes the following steps of:

providing a first lens group and a second lens group, in this order from an object, as focus-adjusting lens groups so that the first lens group and the second lens group satisfy the following condition:

$$0.4 < \{K1(L)-K1(S)\}/\{K2(L)-K2(S)\} < 1.6 \quad (1)$$

wherein

K1(L) designates the focus sensitivity of the first lens group at the long focal length extremity;

K1(S) designates the focus sensitivity of the first lens group at the short focal length extremity;

K2(L) designates the focus sensitivity of the second lens group at the long focal length extremity;

K2(S) designates the focus sensitivity of the second lens group at the short focal length extremity; and moving the first lens group and the second lens group in the optical-axis direction for performing the narrower zoom adjustment (i.e., for not moving a position of an image plane upon zooming), when the zoom lens system is being assembled.

The focus-adjustment method of the zoom lens system preferably satisfies the following condition:

$$0.2 < X1/X2 < 1.0 \quad (2)$$

wherein

X1 designates the traveling distance of the first lens group; and

X2 designates the traveling distance of the second lens group.

In the focus-adjustment method of the zoom lens system according to the present invention, at least one of any lens groups behind the second lens group can be formed as a third focus-adjusting lens group; and the focus-adjustment method further includes the step of moving the third lens group in the optical-axis direction for performing the back-focus adjustment (i.e., for coinciding the image plane with the image-forming plane), when said zoom lens system is being assembled.

The focus-adjustment method further includes the step of:

measuring the amount of movement of the focal point ($\Delta fb(S)$, $\Delta fb(M)$ and $\Delta fb(L)$) of each of the focus-adjusting lens groups at the short focal length extremity, an intermediate focal length, and the long focal length extremity, respectively; and obtaining the traveling distance (X1, X2 and X3) of each of the focus-adjusting lens groups by utilizing the following equations:

$$A = \begin{pmatrix} K1(S) & K2(S) & K3(S) \\ K1(M) & K2(M) & K3(M) \\ K1(L) & K2(L) & K3(L) \end{pmatrix} \quad [\text{Equation 1}]$$

$$\begin{pmatrix} X1 \\ X2 \\ X3 \end{pmatrix} = -A^{-1} \begin{pmatrix} \Delta fb(S) \\ \Delta fb(M) \\ \Delta fb(L) \end{pmatrix} \quad [\text{Equation 2}]$$

wherein

K1(L) designates the focus sensitivity of the first focus adjustment lens group at the long focal length extremity;

K1(M) designates the focus sensitivity of the first lens group at an intermediate focal length;

K1(S) designates the focus sensitivity of the first lens group at the short focal length extremity;

K2(L) designates the focus sensitivity of the second lens group at the long focal length extremity;

K2(M) designates the focus sensitivity of the second lens group at an intermediate focal length;

K2(S) designates the focus sensitivity of the second lens group at the short focal length extremity;

K3(L) designates the focus sensitivity of the third lens group at the long focal length extremity;

K3(M) designates the focus sensitivity of the third lens group at an intermediate focal length; and K3(S) designates the focus sensitivity of the third lens group at the short focal length extremity.

In the focus-adjustment method of the zoom lens system according to the present invention, all the lens group of the zoom lens system can be formed as the focus-adjusting lens groups; and the focus-adjustment method further includes the step of moving all the lens group of the zoom lens system in the optical-axis direction for performing the back-focus adjustment (i.e., for coinciding the image plane with the image-forming plane), when the zoom lens system is being assembled.

Furthermore, in a more general case where the focus-adjusting lens groups are constituted by "n" (including the first and second lens groups) lens groups, the focus-adjustment method of a zoom lens system includes the steps of:

measuring the amount of movement of the focal point ($\Delta fb(f1)$, $\Delta fb(f2)$ - - - $\Delta fb(fn)$) at the "n" focal length positions, respectively; and obtaining the traveling distance (X1, X2, - - - Xn) of each of the focus-adjusting lens groups by utilizing the following equations:

$$A = \begin{pmatrix} K1(f1) & K2(f1) & \cdots & Kn(f1) \\ K1(f2) & K2(f2) & \cdots & Kn(f2) \\ \vdots & \vdots & \vdots & \vdots \\ K1(fn) & K2(fn) & \cdots & Kn(fn) \end{pmatrix} \quad [\text{Equation 3}]$$

$$\begin{pmatrix} X1 \\ X2 \\ \vdots \\ Xn \end{pmatrix} = -A^{-1} \begin{pmatrix} \Delta fb(f1) \\ \Delta fb(f2) \\ \vdots \\ \Delta fb(fn) \end{pmatrix} \quad [\text{Equation 4}]$$

wherein

K1(f1) designates the focus sensitivity of the first lens group at a focal length f1;

K1(f2) designates the focus sensitivity of the first lens group at a focal length f2;

K1(fn) designates the focus sensitivity of the first lens group at a focal length fn;

K2(f1) designates the focus sensitivity of the second lens group at the focal length f1;

K2(f2) designates the focus sensitivity of the second lens group at the focal length f2;

K2(fn) designates the focus sensitivity of the second lens group at the focal length fn;

Kn(f1) designates the focus sensitivity of the $n^{th}$ lens group at the focal length f1;

Kn(f2) designates the focus sensitivity of the $n^{th}$ lens group at the focal length f2;

Kn(fn) designates the focus sensitivity of the $n^{th}$ lens group at the focal length fn; and Xn designates the traveling distance of the $n^{th}$ lens group.

The present disclosure relates to subject matter contained in Japanese Patent Application No. 2003-090112 (filed on Mar. 28, 2003) which is expressly incorporated herein in its entirety.

BRIEF DESCRIPTION OF THE DRAWINGS

The present invention will be discussed below in detail with reference to the accompanying drawings, in which:

FIG. 1 is a lens arrangement and lens-group moving paths of the zoom lens system (or a variable-focus lens system) to which a focus-adjustment method is applied; and FIG. 2 is a conceptual diagram showing the position of the focal point before and after the focus adjustment (the broader zoom adjustment).

DESCRIPTION OF THE PREFERRED EMBODIMENTS

FIG. 1 is the lens arrangement and lens-group moving paths of the zoom lens system (or a variable-focus lens system) to which the focus-adjustment method is applied.

The zoom lens system 10 includes a first lens group 11 having a positive refractive power (hereinafter, the positive first lens group), a second lens group 12 having a negative refractive power (hereinafter, the negative second lens group), a positive third lens group 13, and positive fourth lens group 14, in this order from the object.

Upon zooming from the short focal length extremity S to the long focal length extremity L, the positive first lens group 11 and the positive third lens group 13 move toward the object, the negative second lens group 12 moves toward the image, and the positive fourth lens group 14 does not move. The positive fourth lens group 14 is a focusing lens group, and is moved upon focusing. On the other hand, in the case of a variable-focus lens system, the positive fourth lens group 14 is arranged to be movable by a predetermined traveling distance for compensating the movement of the focal point according to zooming (variable power)

The numeral 15 designates a focal-plane position (the image plane on design, and the image-forming plane (a CCD or the film, etc.)), and a filter group 16 is provided between the positive fourth lens group 14 and the focal-plane position 15. Here, the image plane is a plane on which an image formed by the photographing lens system is formed. Accordingly, the image plane on design indicates an ideal state corresponding to design requirements.

The narrower zoom adjustment in which the position of the focal point maintains parallel (within an allowable tolerance) with the focal-plane position 15 upon zooming is performed by adjusting the positions of the positive first lens group 11 and the negative second lens group 12 in the optical axis direction. In the narrower zoom adjustment, the focus sensitivity of the positive first lens group 11 and that of the negative second lens group 12 satisfy condition (1). Note that the focus sensitivity is a traveling distance of the image plane (not the film plane, etc.) when a predetermined lens group is moved by a (predetermined) unit distance.

If $\{K1(L)-K1(S)\}/\{K2(L)-K2(S)\}$ exceeds the lower limit of condition (1), the difference in focus sensitivity of the positive first lens group 11 at the short focal length extremity and the long focal length extremity becomes smaller, so that the amount of the narrower zoom adjustment for the positive first lens group 11 becomes larger. Consequently, the overall length of the zoom lens system becomes longer.

If $\{K1(L)-K1(S)\}/\{K2(L)-K2(S)\}$ exceeds the upper limit of condition (1), the difference in the focus sensitivity of the negative second lens group 12 at the short focal length extremity and the long focal length extremity becomes smaller, so that the amount of the narrower zoom adjustment for the negative second lens group 12 becomes larger. Consequently, the overall length of the zoom lens system becomes longer. Here, note that there are optical systems in which by only carrying out the narrower zoom adjustment can complete the broader zoom adjustment (the focus adjustment). The dotted lines shown in FIG. 2 indicate the focal-plane position 15 (the image plane on design), and the solid lines indicate the focus position.

In the narrower zoom adjustment, the traveling distance of the positive first lens group 11 and that of the negative second lens group 12 preferably satisfy condition (2).

If X1/X2 exceeds the lower limit of condition (2), the effect of having two adjustment positions, i.e., the positive first lens group 11 and the negative second lens group 12, becomes smaller. In other words, the traveling distance of the negative second lens group 12 becomes relatively longer, so that there is a need to secure a distance between the positive first lens group 11 and the negative second lens group 12, and to secure a distance between the positive third lens group 13 and the negative second lens group 12. Consequently, the overall length of the zoom lens system 10 becomes undesirably larger.

If X1/X2 exceeds the upper limit of condition (2), the traveling distance of the positive first lens group 11 becomes longer, so that the diameter of the positive first lens group 11 has to be made larger in order to sufficiently collect peripheral illumination.

As a result of performing the narrower zoom adjustment, if the position of the focal point upon zooming is within an allowable tolerance of the image plane 15 on design, the broader zoom adjustment (the focus adjustment) is completed.

However, it is generally known that the position of the focal point upon zooming does not coincide with the image plane 15 on design by the narrower zoom adjustment. Therefore at least one of any lens groups behind the negative second lens group 12 is preferably formed as a third focus-adjusting lens group for performing the back-focus adjustment; or, all the lens groups can be formed as the focus-adjusting lens groups for performing the back-focus adjustment.

For example, in the case of the zoom lens system having four lens groups, the amount of movement of the focal point (Δfb(S), Δfb(M) and Δfb(L)) at the short focal length extremity, an intermediate focal length, and the long focal length extremity, are respectively measured by moving the positive fourth lens group 14 for performing the back-focus adjustment; and, the traveling distance (X1, X2 and X3) of each focus-adjusting lens group by utilizing the following equations:

$$A = \begin{pmatrix} K1(S) & K2(S) & K3(S) \\ K1(M) & K2(M) & K3(M) \\ K1(L) & K2(L) & K3(L) \end{pmatrix}$$ [Equation 1]

$$\begin{pmatrix} X1 \\ X2 \\ X3 \end{pmatrix} = -A^{-1} \begin{pmatrix} \Delta fb(S) \\ \Delta fb(M) \\ \Delta fb(L) \end{pmatrix}$$ [Equation 2]

wherein

K1(L) designates the focus sensitivity of the first lens group at the long focal length extremity;

K1(M) designates the focus sensitivity of the first lens group at an intermediate focal length;

K1(S) designates the focus sensitivity of the first lens group at the short focal length extremity;

K2(L) designates the focus sensitivity of the second lens group at the long focal length extremity;

K2(M) designates the focus sensitivity of the second lens group at an intermediate focal length;

K2(S) designates the focus sensitivity of the second lens group at the short focal length extremity;

K3(L) designates the focus sensitivity of the third lens group at the long focal length extremity;

K3(M) designates the focus sensitivity of the third lens group at an intermediate focal length; and K3(S) designates the focus sensitivity of the third lens group at the short focal length extremity.

In first through third embodiments, (i) the positive fourth lens group 14 is provided as the third focus-adjusting lens group, and (ii) the traveling distances (X1, X2 and X3) of the positive first lens group 11, the negative second lens group 12 and the positive fourth lens group 14 are obtained by utilizing the equations 1 and 2.

[Embodiment 1]

Table 1 shows zoom lens data corresponding to the zoom lens system of FIG. 1, according to the first embodiment.

In Table 1, S, M and L designate the short focal length extremity, an intermediate focal length, and the long focal length extremity, respectively; f designates the focal length; and Fno. designates the f-number.

TABLE 1

Data of Entire Zoom Lens System:

|  | S | M | L |
|---|---|---|---|
| f = | 7.7 | 18.0 | 39.0 |

Data of each Lens Group Under the Condition that an Object at Infinity is in an In-focus State:

| | Magnification | | |
|---|---|---|---|
| Lens Group No. | S | M | L |
| 1 | 0.000 | 0.000 | 0.000 |
| 2 | −0.326 | −0.453 | −0.612 |
| 3 | −0.597 | −0.996 | −1.597 |
| 4 | 0.724 | 0.724 | 0.724 |

| | Focus Sensitivity of Each Lens Group | | |
|---|---|---|---|
| Lens Group No. | S | M | L |
| 1 | 0.020 | 0.107 | 0.501 |
| 2 | 0.167 | 0.413 | 0.836 |
| 3 | 0.337 | 0.004 | −0.813 |
| 4 | 0.476 | 0.476 | 0.476 |

Measured Values of the Amount of Movement of the Focal Point (a Shift from the Image Plane 15 on Design) at S, M and L:

Δfb(S)=0.239
Δfb(M)=0.383
Δfb(L)=0.704
Utilizing Equations 1 and 2
X1=0.301
X2=0.478
X3=0.322

[Embodiment 2]

Table 2 shows zoom lens data corresponding to the zoom lens system of FIG. 1, according to the second embodiment.

The symbols in Table 2 are the same as those of the first embodiment (Table 1).

TABLE 2

Data of Entire Zoom Lens System:

|  | S | M | L |
|---|---|---|---|
| f = | 7.8 | 18.0 | 39.0 |

Data of each Lens Group Under the Condition that an Object at Infinity is in an In-focus State:

| | Magnification | | |
|---|---|---|---|
| Lens Group No. | S | M | L |
| 1 | 0.000 | 0.000 | 0.000 |
| 2 | −0.314 | −0.431 | −0.569 |
| 3 | −0.599 | −1.009 | −1.654 |
| 4 | 0.736 | 0.736 | 0.736 |

| | Focus Sensitivity of Each Lens Group | | |
|---|---|---|---|
| Lens Group No. | S | M | L |
| 1 | 0.019 | 0.102 | 0.480 |
| 2 | 0.175 | 0.449 | 1.002 |
| 3 | 0.347 | −0.010 | −0.940 |
| 4 | 0.458 | 0.458 | 0.458 |

Measured Values of the Amount of Movement of the Focal Point (a Shift from the Image Plane 15 on Design) at S, M and L:

Δfb(S)=0.256
Δfb(M)=0.410
Δfb(L)=0.766
Utilizing Equations 1 and 2
X1=0.215
X2=0.497
X3=0.360

[Embodiment 3]

Table 3 shows zoom lens data corresponding to the zoom lens system of FIG. 1, according to the third embodiment.

The symbols in Table 3 are the same as those of the first

TABLE 3

Data of Entire Zoom Lens System:

|  | S | M | L |
|---|---|---|---|
| f = | 7.8 | 18.0 | 39.0 |

Data of each Lens Group Under the Condition that an Object at Infinity is in an In-focus State:

| | Magnification | | |
|---|---|---|---|
| Lens Group No. | S | M | L |
| 1 | 0.000 | 0.000 | 0.000 |
| 2 | −0.324 | −0.449 | −0.606 |
| 3 | −0.587 | −0.977 | −1.571 |
| 4 | 0.728 | 0.728 | 0.728 |

-continued

| | Focus Sensitivity of Each Lens Group | | |
|---|---|---|---|
| Lens Group No. | S | M | L |
| 1 | 0.019 | 0.102 | 0.480 |
| 2 | 0.163 | 0.404 | 0.828 |
| 3 | 0.347 | 0.024 | −0.778 |
| 4 | 0.470 | 0.470 | 0.470 |

Measured Values of the Amount of Movement of the Focal Point (a Shift from the Image Plane 15 on Design) at S, M and L:

$\Delta fb(S)=0.245$ $\Delta fb(M)=0.388$ $\Delta fb(L)=0.708$

Utilizing Equations 1 and 2

$X1=0.292$ $X2=0.494$ $X3=0.338$

The numerical values of each condition for each embodiment are shown in Table 4 below.

TABLE 4

| | Embodiment 1 | Embodiment 2 | Embodiment 3 |
|---|---|---|---|
| Condition (1) | 0.719 | 0.557 | 0.694 |
| Condition (2) | 0.630 | 0.433 | 0.592 |

As can be understood from Table 4, each embodiment satisfies each condition.

According to the above description, a focus adjustment for a zoom lens system having at least three lens groups can be easily achieved without increasing the overall length of the zoom lens system.

What is claimed is:

1. A zoom lens system comprising at least three lens groups,
wherein zooming is performed by moving at least two lens groups;
wherein a first lens group and a second lens group, in this order from an object, comprise focus-adjusting lens groups that are movable in the optical-axis direction in order not to move a position of an image plane upon zooming, when said zoom lens system is being assembled; and
wherein said focus-adjusting lens groups satisfy the following condition:

$0.4<\{K1(L)-K1(S)\}/\{K2(L)-K2(S)\}<1.6$ wherein
K1(L) designates the focus sensitivity of said first lens group at the long focal length extremity;
K1(S) designates the focus sensitivity of said first lens group at the short focal length extremity;
K2(L) designates the focus sensitivity of said second lens group at the long focal length extremity; and
K2(S) designates the focus sensitivity of said second lens group at the short focal length extremity.

2. The zoom lens system according to claim 1, wherein at least one of any lens groups behind said second lens group comprises another focus-adjusting lens group that is movable in the optical-axis direction in order to coincide said image plane with the image-forming plane, when said zoom lens system is being assembled.

3. The zoom lens system according to claim 1, wherein all the lens groups of said zoom lens system comprise focus-adjusting lens groups that are movable in the optical-axis direction in order to coincide said image plane with the image-forming plane, when said zoom lens system is being assembled.

4. A focus-adjustment method of a zoom lens system comprising at least three lens groups,
wherein zooming is performed by moving at least two lens groups;
wherein said focus-adjustment method comprising the steps of:
providing a first lens group and a second lens group, in this order from an object, as focus-adjusting lens groups so that said first lens group and said second lens group satisfy the following condition;

$0.4<\{K1(L)-K1(S)\}/\{K2(L)-K2(S)\}<1.6$ wherein
K1(L) designates the focus sensitivity of said first lens group at the long focal length extremity;
K1(S) designates the focus sensitivity of said first lens group at the short focal length extremity;
K2(L) designates the focus sensitivity of said second lens group at the long focal length extremity;
K2(S) designates the focus sensitivity of said second lens group at the short focal length extremity; and
moving said first lens group and said second lens group in the optical-axis direction in order not to move a position of an image plane upon zooming, when said zoom lens system is being assembled.

5. The focus-adjustment method of a zoom lens system according to claim 4, wherein said first lens group and said second lens group satisfy the following condition:

$0.2<X1/X2<1.0$ wherein
X1 designates the traveling distance of said first lens group; and
X2 designates the traveling distance of said second lens group.

6. The focus-adjustment method of a zoom lens system according to claim 4, wherein at least one of any lens groups behind said second lens group comprises a third focus-adjusting lens group; and
wherein said focus-adjustment method further comprising the step of moving said third lens group in the optical-axis direction in order to coincide said image plane with the image-forming plane, when said zoom lens system is being assembled.

7. The focus-adjustment method of a zoom lens system according to claim 6, further comprising the steps of:
measuring the amount of movement of the focal point ($\Delta fb(S)$, $\Delta fb(M)$ and $\Delta fb(L)$) of said third focus-adjusting lens group at the short focal length extremity, an intermediate focal length, and the long focal length extremity, respectively; and
obtaining the traveling distance (X1, X2 and X3) of each of said focus-adjusting lens groups by utilizing the following equations:

$$A = \begin{pmatrix} K1(S) & K2(S) & K3(S) \\ K1(M) & K2(M) & K3(M) \\ K1(L) & K2(L) & K3(L) \end{pmatrix}$$

$$\begin{pmatrix} X1 \\ X2 \\ X3 \end{pmatrix} = -A^{-1} \begin{pmatrix} \Delta fb(S) \\ \Delta fb(M) \\ \Delta fb(L) \end{pmatrix}$$

wherein

K1(L) designates the focus sensitivity of said first lens group at the long focal length extremity;

K1(M) designates the focus sensitivity of said first lens group at an intermediate focal length;

K1(S) designates the focus sensitivity of said first lens group at the short focal length extremity;

K2(L) designates the focus sensitivity of said second lens group at the long focal length extremity;

K2(M) designates the focus sensitivity of said second lens group at an intermediate focal length;

K2(S) designates the focus sensitivity of said second lens group at the short focal length extremity;

K3(L) designates the focus sensitivity of said third lens group at the long focal length extremity;

K3(M) designates the focus sensitivity of said third lens group at an intermediate focal length; and K3(S) designates the focus sensitivity of said third lens group at the short focal length extremity.

8. The focus-adjustment method of a zoom lens system according to claim 4, wherein said focus-adjusting lens groups comprise "n" lens groups (including said first and second lens groups);

wherein said focus-adjustment method of a zoom lens system comprising the steps of:

measuring the amount of movement of the focal point ($\Delta fb(f1)$, $\Delta fb(f2)$ - - - $\Delta fb(fn)$) at the "n" focal length positions, respectively; and obtaining the traveling distance (X1, X2, - - - Xn) of each of said focus-adjusting lens groups by utilizing the following equations:

$$A = \begin{pmatrix} K1(f1) & K2(f1) & \cdots & Kn(f1) \\ K1(f2) & K2(f2) & \cdots & Kn(f2) \\ \vdots & \vdots & \vdots & \vdots \\ K1(fn) & K2(fn) & \cdots & Kn(fn) \end{pmatrix}$$

$$\begin{pmatrix} X1 \\ X2 \\ \vdots \\ Xn \end{pmatrix} = -A^{-1} \begin{pmatrix} \Delta fb(f1) \\ \Delta fb(f2) \\ \vdots \\ \Delta fb(fn) \end{pmatrix}$$

wherein

K1(f1) designates the focus sensitivity of said first lens group at a focal length f1;

K1(f2) designates the focus sensitivity of said first lens group at a focal length f2;

K1(fn) designates the focus sensitivity of said first lens group at a focal length fn;

K2(f1) designates the focus sensitivity of said second lens group at the focal length f1;

K2(f2) designates the focus sensitivity of said second lens group at the focal length f2;

K2(fn) designates the focus sensitivity of said second lens group at the focal length fn;

Kn(f1) designates the focus sensitivity of said nth lens group at the focal length f1;

Kn(f2) designates the focus sensitivity of said nth lens group at the focal length f2;

Kn(fn) designates the focus sensitivity of said nth lens group at the focal length fn; and Xn designates the traveling distance of said nth lens group.

9. The focus-adjustment method of a zoom lens system according to claim 4, wherein all the lens group of said zoom lens system comprise said focus-adjusting lens groups; and wherein said focus-adjustment method further comprises the step of moving all the lens group of said zoom lens system in the optical-axis direction in order to coincide said image plane with the image-forming plane, when said zoom lens system is being assembled.

* * * * *